(12) United States Patent
Kallman

(10) Patent No.: US 8,447,565 B2
(45) Date of Patent: May 21, 2013

(54) APPROXIMATE ERROR CONJUGATION GRADIENT MINIMIZATION METHODS

(75) Inventor: Jeffrey S. Kallman, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 400 days.

(21) Appl. No.: 12/795,560

(22) Filed: Jun. 7, 2010

(65) Prior Publication Data

US 2011/0302463 A1 Dec. 8, 2011

(51) Int. Cl.
G06F 15/00 (2006.01)
G03C 5/16 (2006.01)

(52) U.S. Cl.
USPC .................................. 702/182; 378/4; 378/21

(58) Field of Classification Search
USPC ............... 702/182; 714/699, E11.022; 378/4, 378/21, 46, 101
See application file for complete search history.

(56) References Cited

U.S. PATENT DOCUMENTS 6,754,298 B2 * 6/2004 Fessler ............................. 378/4
2011/0273961 A1 * 11/2011 Hu .................................. 367/47

OTHER PUBLICATIONS

Shanno, David F., "Conjugate Gradient Methods with Inexact Searches" © 1978, The Institute of Management Sciences, Mathematics of Operations Research, vol. 3, No. 3, Aug. 1978.
Norton: Stephen J., "Iterative inverse scattering algorithms: Methods of computing Fréchet derivatives" © 1999 Acoustical Society of America, Journal of Acoustical Society of America, 106 (5), Nov. 1999.
Hager et al., "A New Conjugate Gradient Method With Guaranteed Descent and an Efficient Line Search," 2005 Society for Industrial and Applied Mathematics, SIAM J. Optim., vol. 16, No. 1, pp. 170-192.

* cited by examiner

*Primary Examiner* — Bryan Bui
(74) *Attorney, Agent, or Firm* — Dominic M. Kotab

(57) ABSTRACT

In one embodiment, a method includes selecting a subset of rays from a set of all rays to use in an error calculation for a constrained conjugate gradient minimization problem, calculating an approximate error using the subset of rays, and calculating a minimum in a conjugate gradient direction based on the approximate error. In another embodiment, a system includes a processor for executing logic, logic for selecting a subset of rays from a set of all rays to use in an error calculation for a constrained conjugate gradient minimization problem, logic for calculating an approximate error using the subset of rays, and logic for calculating a minimum in a conjugate gradient direction based on the approximate error. In other embodiments, computer program products, methods, and systems are described capable of using approximate error in constrained conjugate gradient minimization problems.

20 Claims, 3 Drawing Sheets

APPROXIMATE ERROR CONJUGATION GRADIENT MINIMIZATION METHODS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to conjugate gradient solutions, and more particularly, to methods using approximate error conjugate gradient minimization.

BACKGROUND

Conjugate gradient algorithms are used for nonlinear optimization problems. Many different nonlinear problems can use conjugate gradient algorithms to find optimal solutions. One such nonlinear problem deals with tomography, which can be described as producing images of solid objects based on differences in the observed effects of waves of energy passing through the objects in sections, which is commonly used in radiology. Some examples of tomography include computed tomography (CT), single-photon emission tomography (SPET), positron emission tomography (PET), etc. In some more complicated iterative tomographic methods, tomographic reconstruction algorithms are used which may result in expansive problem sets using massive amounts of computing power to solve using conventional techniques.

Currently used analytical methods have difficulty with analyzing nonstandard geometries and nonuniform sampling data that is generated by tomographic data acquisition systems. Wide cone angles, linear and area array sources, and nonuniform sampling systems are not handled well by single pass reconstruction algorithms. Therefore, a general reconstruction method that is not dependent on any particular geometry, can incorporate a priori information, can give weight to more important data, and/or can incorporate regularization would be very beneficial to solving these issues. Such a methodology, however, has heretofore required vast amounts of computing power and/or resources in order to operate. Therefore, a methodology which does not expend vast amounts of computing power and/or resources to perform single pass reconstruction on these types of data sets would be very beneficial.

SUMMARY

In one embodiment, a method includes selecting a subset of rays from a set of all rays to use in an error calculation for a constrained conjugate gradient minimization problem, calculating an approximate error using the subset of rays, and calculating a minimum in a conjugate gradient direction based on the approximate error.

In another embodiment, a system includes a processor for executing logic, logic for selecting a subset of rays from a set of all rays to use in an error calculation for a constrained conjugate gradient minimization problem, logic for calculating an approximate error using the subset of rays, and logic for calculating a minimum in a conjugate gradient direction based on the approximate error.

According to another embodiment, a computer program product includes a computer readable storage medium having computer readable program code embodied therewith. The computer readable program code is configured to select a subset of rays from a set of all rays to use in an error calculation for a constrained conjugate gradient minimization problem, to calculate an approximate error using the subset of rays, and to calculate a minimum in a conjugate gradient direction based on the approximate error.

Other aspects and embodiments of the present invention will become apparent from the following detailed description, which, when taken in conjunction with the drawings, illustrate by way of example the principles of the invention.

DETAILED DESCRIPTION

Figure 1:
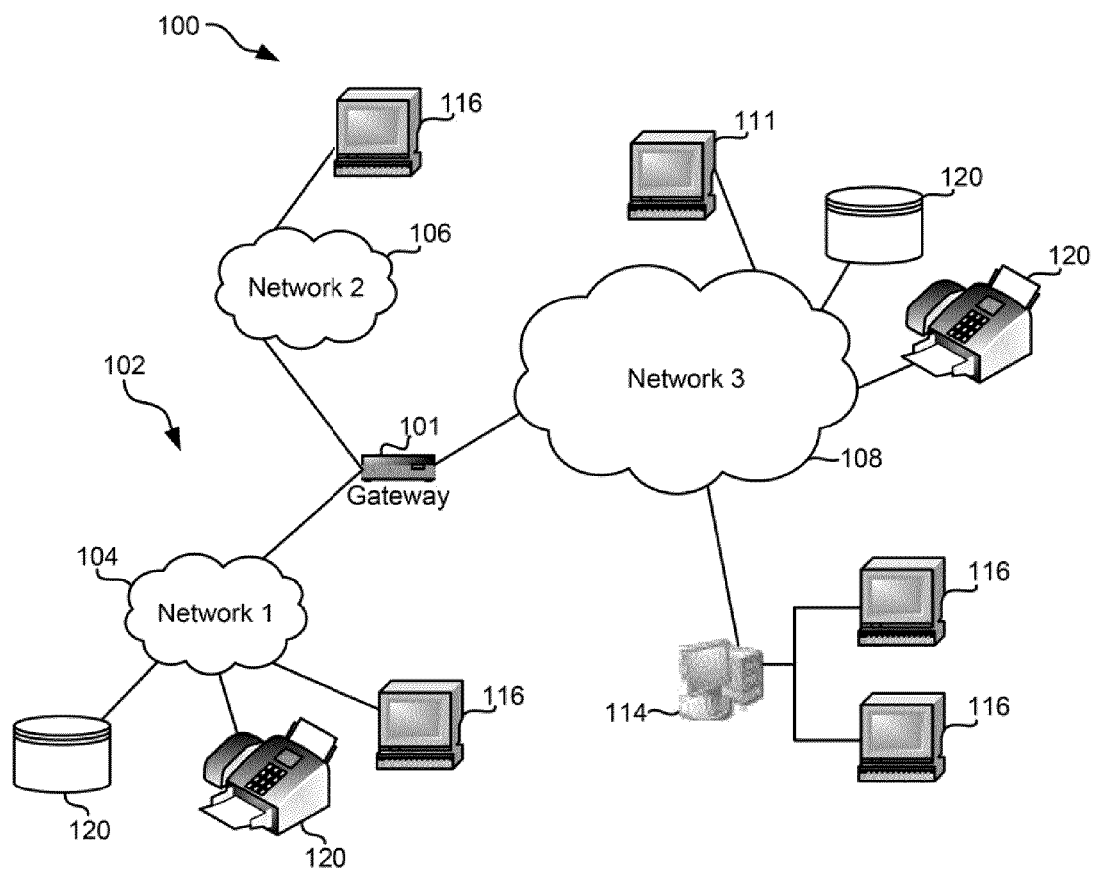
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method includes selecting a subset of rays from a set of all rays to use in an error calculation for a constrained conjugate gradient minimization problem, calculating an approximate error using the subset of rays, and calculating a minimum in a conjugate gradient direction based on the approximate error.

In another general embodiment, a system includes a processor for executing logic, logic for selecting a subset of rays from a set of all rays to use in an error calculation for a constrained conjugate gradient minimization problem, logic for calculating an approximate error using the subset of rays, and logic for calculating a minimum in a conjugate gradient direction based on the approximate error.

According to another general embodiment, a computer program product includes a computer readable storage medium having computer readable program code embodied therewith. The computer readable program code is configured to select a subset of rays from a set of all rays to use in an error calculation for a constrained conjugate gradient minimization problem, to calculate an approximate error using the subset of rays, and to calculate a minimum in a conjugate gradient direction based on the approximate error.

The description provided herein enables any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices, and/or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc. A computer readable medium may also include a signal medium such as a wire, network link, wireless link, etc. across which data and/or instructions may be transmitted.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
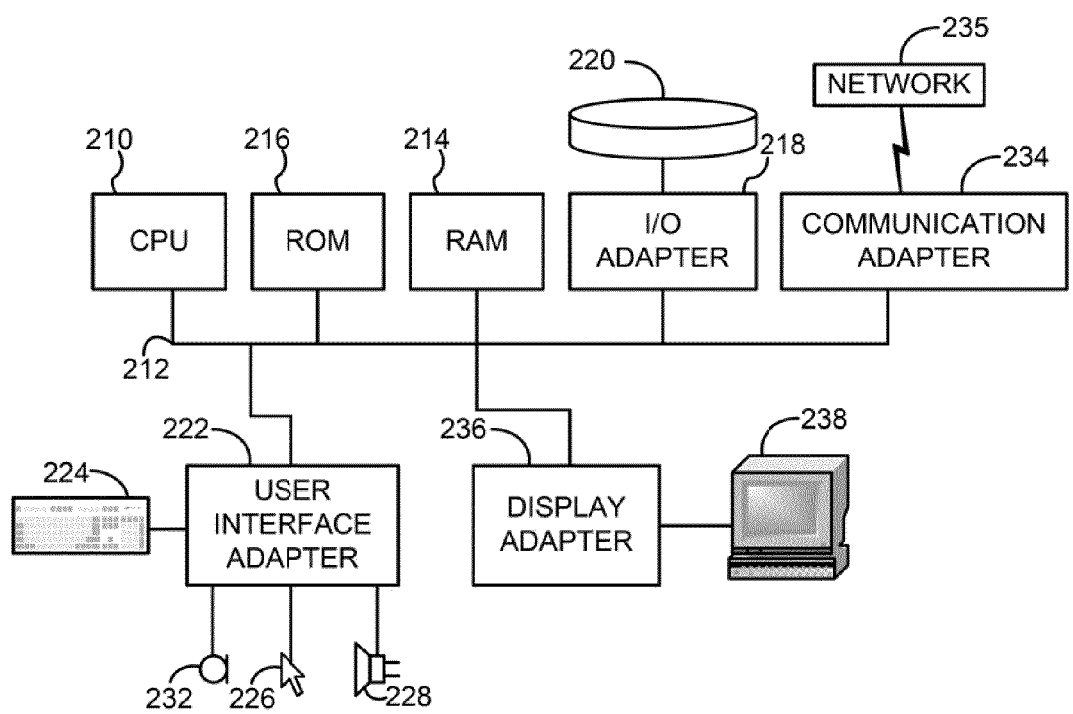
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Nonlinear conjugate gradient methods are used in various different applications. They are iterative methods which generate a sequence of approximations to minimize a scalar function of a vector variable. An iterative reconstruction algorithm using a constrained conjugate gradient (CCG) method which uses a directional derivative derived from a ray equation and its adjoint may be used in many different fields. In the conjugate gradient algorithm, one of the most time consuming operations is a line search to minimize the error. In a normal line search to evaluate error, conventional methods can take extremely long amounts of time and billions of computations to complete. For this problem, in one embodiment, an approximation of the error, which is easier to compute than the true error, may be used in the line minimization portion of the conjugate gradient algorithm to reduce the amount of time and calculations used to complete the error calculations. Examples of error calculations are shown below, with Equation 1 showing an exemplary calculation for the true error, and Equation 2 showing an exemplary calculation for an approximation of the error.

$$E[\mu(\vec{r})] = \frac{1}{2}\sum_{m=1}^{M} w_m [I_m(s_{final}) - I_{m,obs}(s_{final})]^2 \qquad \text{Equation 1}$$

$$E[\mu(\vec{r})] = \frac{1}{2} \sum_{\text{random subset } N \text{ of } M} w_m [I_m(s_{\text{final}}) - I_{m,\text{obs}}(s_{\text{final}})]^2 \quad \text{Equation 2}$$

In Equations 1 and 2, E is the summed squared error, $\mu$ is the attenuation as a function of position $\vec{r}$, M is the number of voxels in the entire problem, $w_m$ is a weight on each individual ray, $I_m$ is the intensity computed using the current reconstruction, $I_{m,\text{abs}}$ is the actual data to be matched, and $s_{\text{final}}$ is the ray destination. The approximation comes in using a small random subset of the rays to estimate the error.

As can be seen from Equation 1 and Equation 2 above, the error approximation in Equation 2 is a calculation which involves less computations than the true error calculation shown in Equation 1. Although not all embodiments have error calculations of these types, they are representative, as examples, of the reduction in computations that can be achieved using approximate error calculations.

Conjugate gradient minimization is an iterative technique. In each iteration, a search direction is chosen based on the past directions and the current directional derivative. The search direction is followed to find the minimum in the chosen direction. The search for the minimum in the conjugate gradient direction may require many evaluations of the error for the system, and for a large system, this may be one of the most time consuming parts of the conjugate gradient algorithm. This search may involve tens of evaluations of the forward model and error function for the problem. For example, even for a modest problem involving 500 rays in 500 views interacting with approximately 500 voxels apiece, there are on the order of $1.25 \times 10^8$ computations per forward modeling and error evaluation. More computations are used in actuality because the model is changing as the search is performed along the line. Therefore, by speeding up the line search (this portion of the algorithm), significant improvements in overall calculation times may be achieved, according to one embodiment.

In some embodiments, it is generally desirable to cut the computational effort of the method by using inexact line searches. In some approaches, the line search procedure is stopped before it finally converges (which may save a few evaluations of the function). This is the theoretical basis that allows for some of the embodiments described herein. Since the absolute error is not used in the line search (only that the minimum along the line is found), it has been surprisingly found that a fast approximation of the error with a minimum in about the same location may be used to replace the absolute error, in some embodiments, to still produce a solution acceptably close to those provided through the full calculation. It is also anticipated that highly connected problems will achieve better results than those conjugate gradient problems which are loosely connected.

If a random sample of the set of all rays (the true set of rays) is used instead of the true set of rays, and this subset of rays is used to approximate the behavior of the error in a minimization step, the computational effort can be reduced significantly in preferred embodiments.

One of the things that is known about the attenuation distribution that was used to describe the problems evaluated in some approaches is that it will always be positive. Therefore, this constraint may be enforced every so often during the conjugate gradient solution to the problem. Whenever the constraint is imposed, the accumulated conjugate gradient direction is discarded and the process is started over, in one approach.

For the problem of x-ray computed tomography (CT), a distribution of voxel attenuation values that minimizes the error between a forward model based on the voxel values and the actual data collected in a CT machine is sought. The error metric usually chosen is the squared error of the forward modeled rays minus the data, in one embodiment. One of the ways of deciding how to change the current voxel attenuation distribution is to use a conjugate gradient minimization based on the directional derivative of the error.

In the case of x-ray CT, a function with a similar minimum location as the true error curve may be generated by taking a random subset of the rays, which number less than the total set of rays, according to some embodiments. The minimum location will not be in quite the same location as that determined by using the true error, but if a different random subset of rays is chosen for each iteration, the system converges to a solution very similar to that arrived at by using the true error while using less calculations to do so.

For 2-dimensional reconstructions, a subset of rays which equals the square root of the true ray count may be used, according to one embodiment. Of course, any number of rays may be used to form the subset of rays, as long as the rays chosen exist in the true set of rays. By using a number of rays in the subset of rays which equals the square root of the true ray count, run time reductions on the order of 40 times for systems with approximately 1 million rays may be achieved, in one embodiment. Put another way, this cuts the computational effort of the line search down to less than two full evaluations of the forward model and resultant error. In some embodiments, unattenuated rays may be filtered out from the subset.

For 3-dimensional reconstructions, a subset of rays which equals the cube root of the true ray count may be used, according to one embodiment. Of course, any number of rays may be used to form the subset of rays, as long as the rays chosen exist in the true set of rays.

In larger optimization problems, the subset of rays may number any amount less than the total true ray count, in various approaches.

Figure 3:
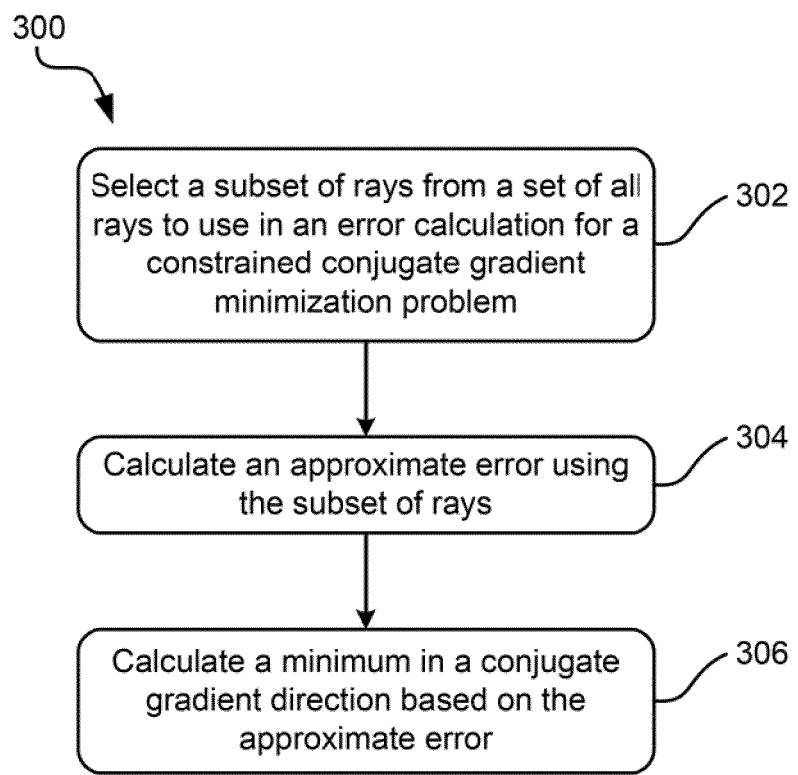
FIG. 3 is a flowchart of a method, according to one embodiment.

Now referring to FIG. 3, a method 300 is shown according to one embodiment. The method 300 may be carried out in any desired environment, and may include more operations than those described below and shown in FIG. 3.

In operation 302, a subset of rays is selected from a set of all rays to use in an error calculation for a constrained conjugate gradient minimization problem. The error calculation may be similar to that shown in Equation 2, or may be any error calculation that may be determined based on the type of conjugate gradient (CG) minimization problem being solved. A typical error computation may be a sum of squared errors, although any error computation which can be used to derive a directional derivative may be used.

In operation 304, an approximate error is calculated using the subset of rays. This calculation is designed to save time and computational power, as well as providing an acceptable solution to the CCG minimization problem being solved.

In operation 306, a minimum in a conjugate gradient direction is calculated based on the approximate error. This calculation may also be based on the type of CCG minimization problem being solved.

In some embodiments, a different subset of rays may be selected for each iteration of the conjugate gradient minimization calculation. This allows for a broad base of rays to be represented in the various error calculations over the extent of the iterations calculated, thereby resulting in a more acceptable approximation of the error.

In more approaches, a number of rays in the subset of rays may be equal to about a square root, about a cube root, about a fourth root, about half, about 1/1000, etc., of a number of rays in the set of all rays. Of course, any reduction in the total number of rays may be used to arrive at the number of rays populating the subset of rays, with the time and computational savings being sacrificed as more rays are included in the subset, in one approach.

According to another embodiment, the method 300 may include determining if the approximate error calculation using the subset of rays is conforming (e.g., it meets the Wolfe conditions for convergence, as described in equations 2.2 and 2.3 of William W. Hager and Hongchaou Zhang, "A new Conjugate Gradient Method with Guaranteed Descent and an Efficient Line Search," SIAM J. Optim., Vol. 16, No. 1, pp. 170-192, 2005). Additionally, the method 300 may also include increasing a number of rays in the subset of rays to form a second subset of rays or selecting a different subset of rays from the set of all rays to form a second subset of rays if the approximate error calculation using the subset of rays is not conforming, and calculating an approximate error using the second subset of rays. These additional operations provide for assurance that the subset of rays selected do not hinder the completion of the CG minimization problem being solved.

In more approaches, the subset of rays may be selected at random from the set of all rays or may be selected from the set of all rays to produce an acceptable distribution of selected rays. It can be determined that an acceptable distribution of rays has been chosen, in one approach, based on whether the approximate error calculation using the subset of rays conforms, as described above. A random selection is easy to implement and will, in most cases, provide an adequate distribution of the rays selected. However, in some cases, and possibly if the error calculation is not conforming, a more deterministic set of rays may be selected to populate the subset of rays, thereby providing a more representative sampling from the total set of rays.

The methods described above may also be implemented in a system with a processor and logic (hardware and/or software) for performing the operations of method 300 and embodiments thereof. In addition, a computer program product may incorporate embodiments of method 300, and may include a computer readable storage medium having computer readable program code embodied therewith. The computer readable program code may comprise code configured to select a subset of rays from a set of all rays to use in an error calculation for a constrained conjugate gradient minimization problem, code configured to calculate an approximate error using the subset of rays, and code configured to calculate a minimum in a conjugate gradient direction based on the approximate error. Of course, the computer program product may include any of the embodiments and approaches described regarding method 300, above, as well.

The methods described herein may be applied to a number of different fields. It may be applied to other non-linear conjugate gradient methods, positron emission tomography (PET) scans, single-photon emission tomography (SPET) scans, acoustic tomography, inverse problems, wave tomography, magnetic resonance imaging (MRI) scans, etc., just to name a few.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   acquiring a set of all rays which represent a tomographic image;
   selecting a subset of rays from the set of all rays to use in an error calculation for a constrained conjugate gradient minimization problem;
   calculating an approximate error using the subset of rays;
   calculating a minimum in a conjugate gradient direction based on the approximate error; and
   using the minimum in the conjugate gradient direction in order to complete the conjugate gradient minimization problem related to the tomographic image.

2. The method of claim 1, further comprising selecting a different subset of rays for each iteration of the conjugate gradient minimization calculation.

3. The method of claim 1, wherein a number of rays in the subset of rays equals about a square root of a number of rays in the set of all rays.

4. The method of claim 1, wherein a number of rays in the subset of rays equals about a cube root of a number of rays in the set of all rays.

5. The method of claim 1, further comprising:
   determining if the approximate error calculation using the subset of rays is conforming;
   increasing a number of rays in the subset of rays to form a second subset of rays or selecting a different subset of rays from the set of all rays to form a second subset of rays if the approximate error calculation using the subset of rays is not conforming; and
   calculating an approximate error using the second subset of rays.

6. The method of claim 1, wherein the subset of rays is selected at random from the set of all rays.

7. The method of claim 1, wherein the subset of rays is selected from the set of all rays to produce an acceptable distribution of selected rays.

8. A system, comprising:
   a processor for executing, logic;
   logic for acquiring a set of all rays which represent a tomographic image;
   logic for selecting a subset of rays from the set of all rays to use in an error calculation for a constrained conjugate gradient minimization problem;
   logic for calculating an approximate error using the subset of rays;
   logic for determining if the approximate error calculation using the subset of rays is conforming;
   logic for increasing a number of rays in the subset of rays to form a second subset of rays or selecting a different subset of rays from the set of all rays to form a second subset of rays if the approximate error calculation using the subset of rays is not conforming; and
   logic for calculating an approximate error using the second subset of rays;
   logic for calculating a minimum in a conjugate gradient direction based on the approximate error; and
   logic for using the minimum in the conjugate gradient direction in order to complete the conjugate gradient minimization problem related to the tomographic image.

9. The system of claim 8, further comprising logic for selecting a different subset of rays for each iteration of the conjugate gradient minimization calculation.

10. The system of claim 8, wherein a number of rays in the subset of rays equals about a square root of a number of rays in the set of all rays.

11. The system of claim 8, wherein a number of rays in the subset of rays equals about a cube root of a number of rays in the set of all rays.

12. The system of claim 8, further comprising:
   logic for selecting a search direction based on past search directions and a current directional derivative, wherein the set of all rays are in the chosen search direction.

13. The system of claim 8, wherein the subset of rays is selected at random from the set of all rays.

14. The system of claim 8, wherein the subset of rays is selected from the set of all rays to produce an acceptable distribution of selected rays.

15. A computer program product, comprising:
   a computer readable storage medium having computer readable program code embodied therewith, the computer readable program code comprising:
      computer readable program code configured to acquire a set of all rays which represent a tomographic image;
      computer readable program code configured to select a subset of rays from a set of all rays to use in an error calculation for a constrained conjugate gradient minimization problem;
      computer readable program code configured to calculate an approximate error using the subset of rays;
      computer readable program code configured to calculate a minimum in a conjugate gradient direction based on the approximate error; and
      computer readable program code configured to use the minimum in the conjugate gradient direction in order to complete the conjugate gradient minimization problem related to the tomographic image.

16. The computer program product of claim 15, further comprising computer readable program code configured to select a different subset of rays for each iteration of the conjugate gradient minimization calculation.

17. The computer program product of claim 15, wherein a number of rays in the subset of rays equals about a square root of a number of rays in the set of all rays.

18. The computer program product of claim 15, wherein a number of rays in the subset of rays equals about a cube root of a number of rays in the set of all rays.

19. The computer program product of claim 15, further comprising:
   computer readable program code configured to determine if the approximate error calculation using the subset of rays is conforming;
   computer readable program code configured to increase a number of rays in the subset of rays to form a second subset of rays or selecting a different subset of rays from the set of all rays to form a second subset of rays if the approximate error calculation using the subset of rays is not conforming; and
   computer readable program code configured to calculate an approximate error using the second subset of rays.

20. The computer program product of claim 15, wherein the subset of rays is selected at random from the set of all rays.

* * * * *